United States Patent [19]
Morris

[11] 3,797,378
[45] Mar. 19, 1974

[54] FOOD FRYER WITH CONTINUOUSLY FILTERED COOKING OIL

[76] Inventor: Wolford A. Morris, 1508 S. Lincoln, Springfield, Ill. 62708

[22] Filed: Dec. 13, 1971

[21] Appl. No.: 207,243

Related U.S. Application Data

[63] Continuation-in-part of Ser. No. 30,650, April 22, 1970, Pat. No. 3,648,595.

[52] U.S. Cl............. 99/408, 210/DIG. 8, 210/234, 210/251
[51] Int. Cl. ............................................ A47j 37/12
[58] Field of Search ...... 99/337, 338, 408; 210/251, 210/DIG. 8, 234, 235, 232

[56] References Cited
UNITED STATES PATENTS

| | | | |
|---|---|---|---|
| 3,483,982 | 12/1969 | Nelson | 99/408 |
| 3,648,595 | 3/1972 | Morris | 99/337 |
| 2,488,770 | 11/1949 | Foulds | 210/234 |
| 2,805,314 | 9/1957 | Michaelis | 99/408 |
| 3,399,776 | 9/1968 | Knuth | 210/234 |
| R17,336 | 6/1929 | McKenna | 99/338 |

*Primary Examiner*—Leon G. Machlin

[57] ABSTRACT

An oil filter is formed from a pair of concentric wire frame cylinders having a cylinder of filter paper positioned between them. The filter paper is preferably made from fiber of 100 percent mercerized wood pulp, saturated by a melamine-formaldehyde resin, which is 30 percent by weight. The preferred paper is 32.0 mils thick with an A.C. oil flow test of 150 secs/1,000cc and a Frazier Air Flow of 2.4 cubic feet per square foot of filter material, at a differential pressure of one-half inch of water. The maximum pore size is such that the bubble point is reached at a pressure of forty inches of water.

7 Claims, 9 Drawing Figures

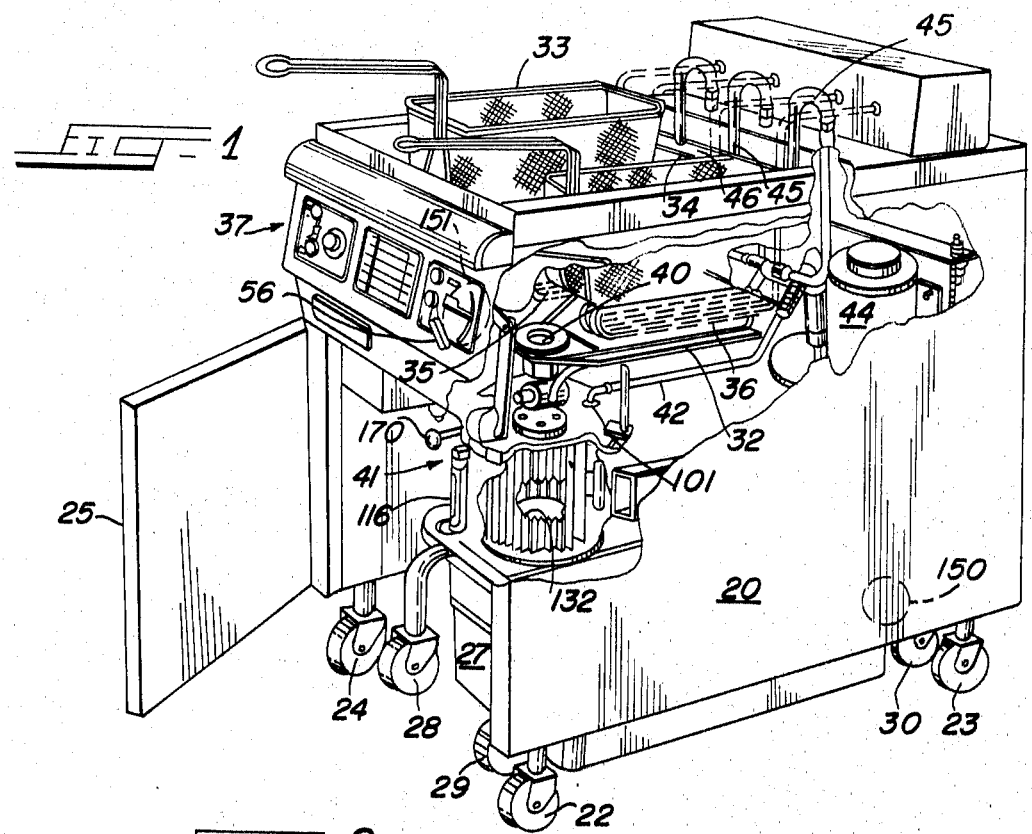
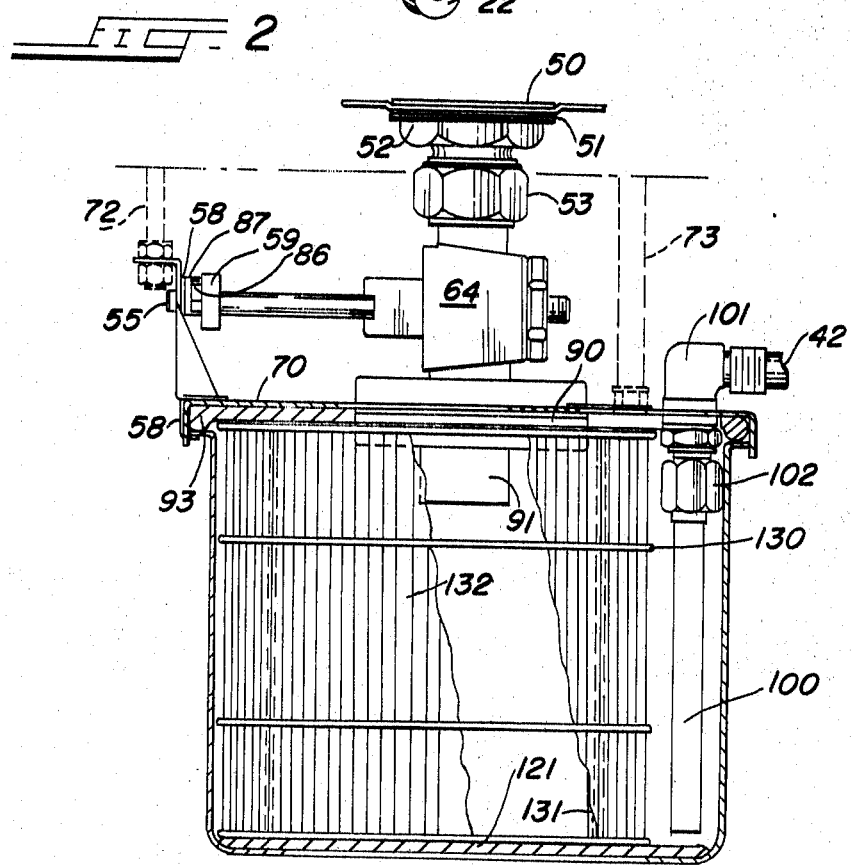

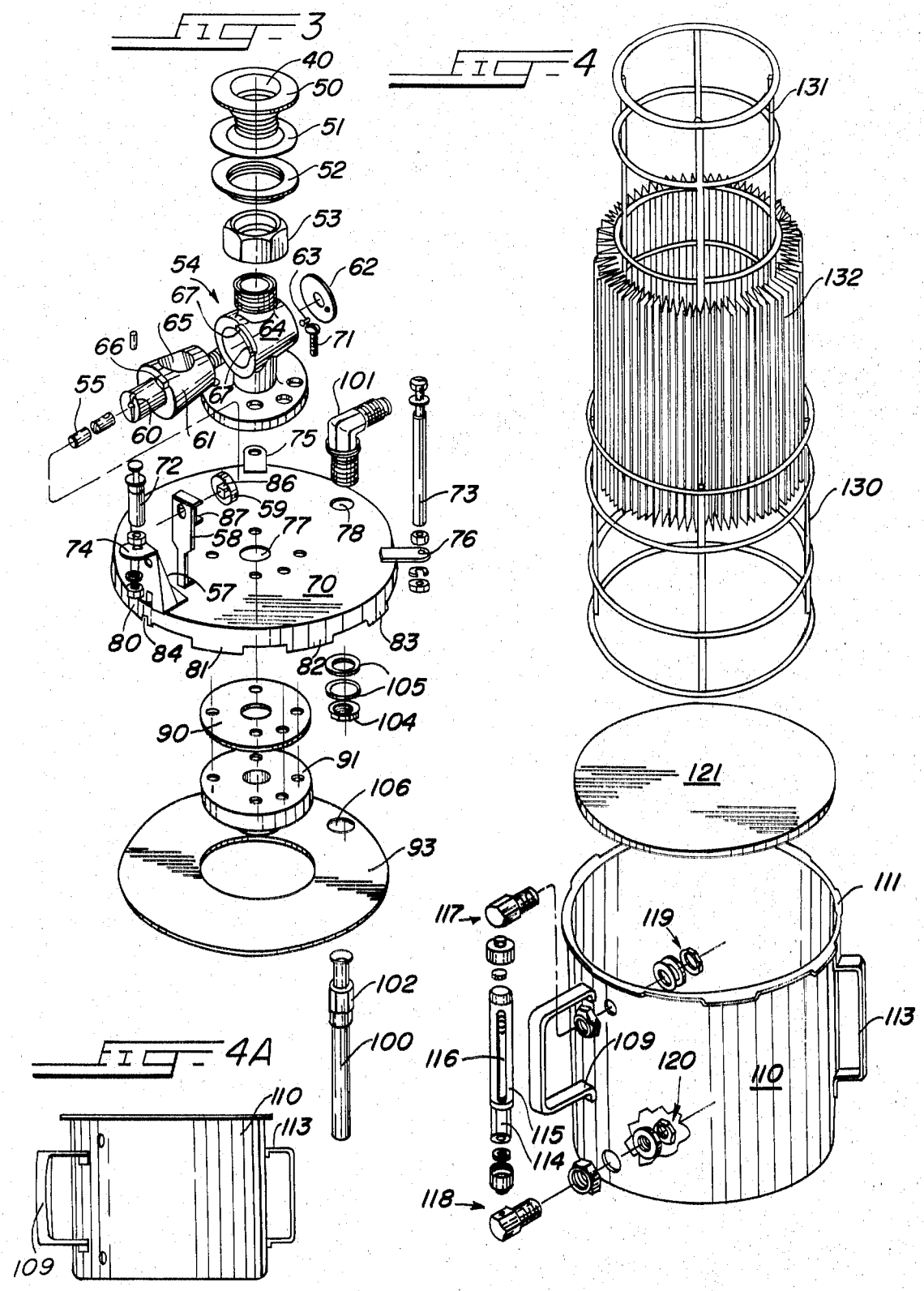

PATENTED MAR 19 1974 3,797,378

FOOD FRYER WITH CONTINUOUSLY FILTERED COOKING OIL

This is a continuation-in-part of my earlier filed copending application entitled "Food Fryer With Continuously Filtered Cooking Oil," Ser. No. 30,650, filed Apr. 22, 1970, now U.S. Pat. No. 3,648,595, issued Mar. 14, 1972.

This invention relates to continuously filtering deep fat fryers, and more particularly to filters for such fryers with interlocking controls for precluding filtration when the oil circulation system is not completely closed.

Deep fat fryers are used to prepare foods such as French fried potatoes, batter covered chicken, or the like. Usually, this mode of cooking is adopted to enhance the flavor of the food. Obviously, therefore, it would be self-defeating if the oil were allowed to become contaminated, since that would adversely affect the flavor.

Accordingly, the above-identified parent application shows a deep fat fryer having means for continously filtering the cooking oil as long as the fryer is in use. This continuation application describes the filter used in that fryer. While the subject filter is directed to a particular one of the filter embodiments in the parent application, it should be understood that certain aspects of the invention apply equally to all embodiments of the filter, as shown there.

In general, an object of the invention is to provide a new and improved filter for continuously filtering cooking oil throughout an entire cooking cycle. Here, an object is to provide a filter arrangement which both traps large solids and strains and filters small particles and foreign flavors from the cooking oil.

Another object of the invention is to provide a simple structure for enabling a quick and easy changing of the filter paper material. Here, an object is to enable the changing of the filter paper while cooking is in progress. Yet another object of the invention is to provide an easy and reliable display for informing an attendant of clogged filter conditions.

Still another object is to reduce the chance of burning an attendant who is replacing the filter. In this connection, an object is to preclude an opening of the cooking oil filter except during a cleaning cycle. In particular, an object is to provide interlocking mechanical and electrical systems to preclude circulation of the oil while the system is partially open.

In keeping with an aspect of this invention, the foregoing and other objects are accomplished by an oil filter which is in the form of a pair of concentric wire frame cages or cylinders with a filter paper cylinder positioned between them. The filter paper is preferably made from 100 percent mercerized wood fiber pulp saturated by a melamine-formaldehyde resin, which is 30 percent by weight. The preferred paper is 32.0 mils thick with an A.C. oil flow test of 150 secs/1,000cc and a Frazier Air Flow of 2.4 cubic feet per square foot of filter material at a differential pressure of one-half inch of water. The maximum pore size is such that the bubble point is reached at a pressure of forty inches of water.

The nature of a preferred embodiment for accomplishing these and other objects may be understood best by a study of the attached drawings, in which:

FIG. 1 is a perspective view of a deep fat fryer constructed according to the teachings of the parent patent application;

FIG. 2 is a cross section of the inventive filter with the filter paper partly broken away to show the interior drain and pumping arrangement;

FIG. 3 is an exploded view of the top of the filter housing structure;

FIG. 4 is an exploded view of the filter and its supporting housing;

FIG. 4A is a perspective view of an alternative embodiment of the filter housing;

Figure 5:
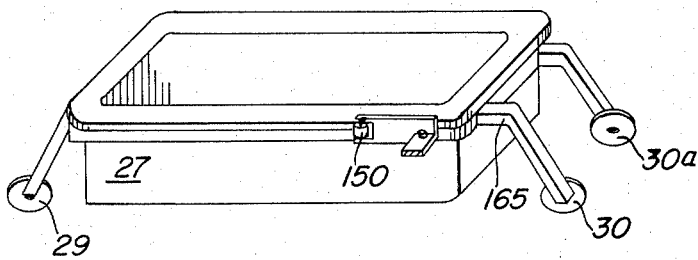
FIG. 5 is a perspective view of a dolly and pan for catching oil draining from the deep well or oil reservoir, including a position detector switch for detecting the pan and precluding drainage of oil except when the dolly and pan are in place.

In FIG. 1, a housing 20 is mounted on suitable wheels 22–24 for roll around use. Inside a front door 25 of the housing 20 is a dolly formed by a rolling pan 27 mounted on wheels 28-30, shown in detail in FIG. 5. In the top of housing 20 is an oil reservoir or deep well 32 for receiving cooking oil and food baskets 33, 34. Heating elements 35, 36 heat the oil in reservoir or well 32 responsive to the setting of controls on a panel 37.

The heater has a thermostat control with a high limit of 401° F. Preferably, the heaters are spaced evenly across the reservoir, approximately at a depth of two-thirds of the reservoir depth. This leaves approximately the lower one-third of the reservoir as a cold zone or a zone for gathering the contaminants that fall from the food products as they are fried. Also, the carbon dropping from the heater and the food particles fall downwardly into this zone. Thus, the circulatory system may eliminate these contaminants. Every 12 minutes the cooking oils circulate through the filter, thereby trapping all of these contaminants.

An oil circulation system gravity feeds cooking oil from the fryer reservoir or deep well 32 into the filter housing 41, and returns it to the reservoir or deep well 32 after it is filtered and freed of contaminants such as breading, carbon, and food products. In greater detail, the bottom of the reservoir well 32 contains a drain 40 leading to a cooking oil filter arrangement 41 containing the inventive filter arrangement. A suction tube 100 (FIG. 2) leading to an exhaust pipe 42 conveys oil from the filter housing to a motor driven pump 44. From there, the oil moves through oil re-introduction tubes 45 and is directed downwardly and onto an oil deflection or splash block ledge 46. The ledge deflects the hot cooking oil into the reservoir well 32 without causing swift currents which may be likely to wash batter or coatings from the food being cooked (e.g., the batter is not washed from breaded chicken).

The nature of the inventive filter arrangement 41 should become more apparent from a study of FIGS. 2–4. In greater detail, the upper housing structure (FIG. 3) includes a drainage flange plate 50 and a gasket 51 positioned inside the reservoir or deep well 32. The plate 50 and gasket 51 are locked in place by a lower nut or plate 52 threaded onto flange plate 50. A union 53 attaches the input of a stopcock-type valve 54 to the bottom of the flange plate 50. The valve 64 is controlled by a handle 56 on panel 37 (FIG. 1) via a shaft 55 (FIG. 3) which extends (in succession) through a mounting bracket 57, sliding cover latch 58, an actuation cam 59, and a locking slot 60 in a rotor 61 of valve 64. A washer 62, spring (not shown), and key 63 lock the rotor 61 in place inside of the valve housing 64.

When the handle 56 and control shaft 55 are in the position shown, the stopcock valve is closed. When rotated, the valve is open, and the cooking oil may drain from the deep well through the rotor valve port 65 and into the filter assembly 41. When the handle is rotated by 90°, the rotor port 65 is horizontal, and no oil can so flow into the filter unit 41. A finger 66 (FIG. 3) on rotor 61 moves between limit stops 67, 67 on the filter housing to fix the valve positions. Mounted on a shaft controlled by and moving with the handle 56 is an actuator finger 68 (FIG. 7) for an electrical switch 69a that starts the motor and pump 44 when the valve operating handle 56 is moved to an open position, and starts a timer (not shown) when the valve operating handle 56 is moved to the close position. In greater detail, when the valve handle 56 is moved to close position, switch 69a energizes a timer which keeps the motor and pump 44 running for two and three-quarters additional minutes, thus causing the oil remaining in the filter housing to be pumped back to the fryer reservoir before removing the filter housing.

A cover plate 70 is attached to the valve housing 64 by any suitable number of bolts 71. A number of hanger bolts 72, 73 are attached between housing 20 and the tabs 74-76 to support the weight of the filter housing. The cover plate 70 includes a first or entrance port 77 for admitting the cooking oil into the filter, and a second or exit port 78 for sucking the oil out of the housing. The lower rim of the cover 70 includes a number of bayonet ears or clamps 80-83 for clamping the housing in place.

Means are provided for preventing an opening of the filter housing while hot cooking oil is being pumped through it. Also, one of the bayonet clamps 80 includes a keeper or a notch 84. The sliding cover latch 58 moves up and down, to engage or disengage this keeper notch, responsive to a sliding of a cam 86 in a slide 87 on a plate 58. The cam is eccentrically mounted on a member 59, which rotates responsive to a turning of the shaft 55 while it controls the stopcock valve rotor 61. When the rotor is positioned to enable hot cooking oil to flow into the filter housing, the latch 58 is raised to engage the keeper notch 84. When the rotor is positioned to stop oil flow, the latch 58 is lowered to disengage the keeper notch. The filter housing cannot be opened when latch 58 is captured in the keeper notch 84.

Inside the cover 70, a lower valve assembly cover gasket 90 seals the opening 77 to preclude any seeping of oil therefrom. A massive collar 91 provides an anchor point for securing the cover to the valve housing. The upper filter housing gasket 93 seals the upper surface of the filter.

An oil evacuating system comprises a suction tube 100, locked to an elbow fitting 101 by a nut 102. Lock nut 104 and packing washers 105 complete an oil-tight seal between the elbow 101 and the cover 70. The nut 102 passes freely through an opening 106 in the gasket 93. The input to pump 44 (FIG. 1) is connected to the elbow 101 by the pipe 42. Thus, oil flows under gravity from the reservoir or deep well 32, through the drain 40 and into the filter housing, from which it is pumped via pipe 100 and fitting 101.

The lower element (FIG. 4) of the filter assembly 41 comprises a pot or bucket 110 having a plurality of bayonet ears 111 which fit into and are captured by the corresponding ears 80-83 on the top 70. In one embodiment (FIG. 4), a pair of handles 112, 113 provide means for giving approximately a 40° turn to the pot or bucket 110, thereby locking the bayonet ears 80-83 and 111 in place.

Means are provided for indicating when the filter is clogged. In greater detail, a sight gauge in the form of vertical glass tube 114 is concentrically positioned inside a protective metal tube 115 having a slot 116 for exposing the oil level to view. Upper and lower fittings 117, 118 (with suitable packing) seal the glass tube to the pot or bucket 110. When the filter is clean, and oil flows freely through the filter paper, the oil fills the glass tube 114, and a high oil level is seen. When the filter becomes clogged, oil does not flow through it as fast as it is pumped out the pipe 100. Accordingly, the oil level drops, as seen in the glass tube 114 at 116. A person, seeing the low oil level, replaces the filter.

A gasket 121 fits into the bottom of the pot or bucket 110 to seal the bottom of the filter element, which is compressed between the gaskets 121, 93 when the pot or bucket 110 is closed.

The filter element includes a pair of cylindrical cages or wire frames 130, 131, coaxially positioned with a pleated filter paper tube 132 positioned therebetween. The oil flowing down drain fitting 91 (FIG. 2) and into the center of paper tube 132 must seep through the pleated filter paper tube 132 before being pumped out the tube 100.

The filter element 132 is preferably made of 100 percent mercerized wood pulp fiber, saturated with 30 percent CYMEL 409 (American Cyanamid Company) and 2 percent ELVA-CET 81-900 (du Pont Company). CYMEL 409 is a melamine-formaldehyde resin as identified in section 121.2536(d)(3) of the Food Additives Regulations, published in the Federal Register of May 7, 1969 (34 F.R. 7372). The extractives limitations that the finished filter meets, for the particular conditions of use, are detailed in paragraphs (e) through (m) of this regulation. The paragraph in the Regulation that seems to be most applicable to this particular use is paragraph (g), which reads as follows:

"g. Resin-bonded filters....".

"1. Total extractives. The finished filter, when exposed to n-hexane at reflux temperature for 2 hours, yields total extractives not to exceed 0.5 percent by weight of the filter."

"2. Conditions of use. It is used to filter edible oils." The cooking temperature is 375° F.

To test for adequacy of the filter material, a suitable sample of the filter material is immersed in n-hexane, in a suitable flask. The flask is attached to a reflex condenser, and the hexane is refluxed for two hours. The flask should then be cooled, and the hexane decanted through a small plug of glass wood (to remove fibers or other particulates) into an evaporating dish. The flask, paper, and glass wool can be rinsed with two or three successive, small portions of fresh hexane. The hexane should then be evaporated to dryness, and the residue is weighed. The weight of the residue should be recorded, together with the original weight of the filter. The weight of the residue should be calculated as a percentage of the filter weight. The Federal regulation requires that this percentage not exceed 0.5.

The filter paper should have a thickness of about 32 mils, with an A.C. oil flow test of seconds/1,000cc. equals about 150.

A Frazier Air Flow test shows about 2.4 cubic feet per minute per square foot at a pressure differential of one-half inch of water pressure. The maximum pore size is such that a bubble point is reached at a pressure equal to 40 inches of water.

Figure 6:
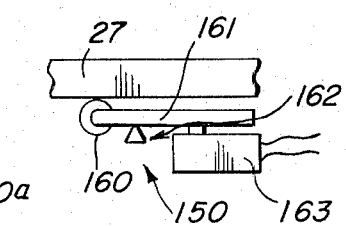
FIG. 6 is a schematic showing of the position detector switch taken along line 6—6 of FIG. 5.
Figure 7:
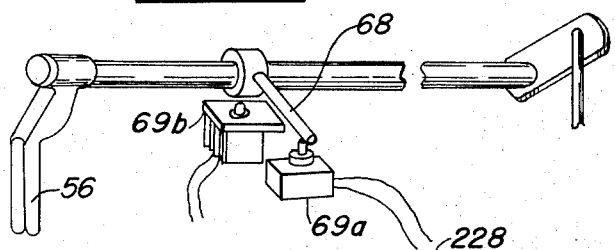
FIG. 7 is a perspective view of an electrical switch which activates the pump and motor-control timer, and an electrical solenoid which prevents movement of the valve operating handle when the lug and dolly are not employed in the fryer as designed.

FIGS. 5-7 show features for interlocking the mechanical systems to insure against pouring hot oils onto the floor at a time when a worker may have inadvertently failed to properly re-locate the portable oil lug pan and dolly. More particularly, FIGS. 5 and 6 show a position detector switch 150 for detecting the presence of the pan 27. This detector switch 150 comprises a roller 160 mounted on the end of an actuator arm 161, effectively rocking on a fulcrum 162. The right-hand end of the actuator arm 161 controls a non-locking switch 163. If the pan 27 is not properly positioned inside housing 20, the roller 160 and the arm 161 are not moved, and the switch 163 is not controlled thereby. On the other hand, the roller 160 does engage the pan 27 if it is properly positioned in the dolly frame 165 and if the frame and pan are properly positioned inside the housing. The position detector switch 163 thus enables the valve 64 to be opened by means of the valve operating handle 56 only when the lug pan and dolly 27 are in a correct position.

The combination of the switch 163 and the solenoid 69b inhibit the valve operating linkage, except when the portable oil lug pan 27 is properly positioned in fryer 20. It should be noted that switch 150 is here shown as making contact with the top of the pan 27; however, it may make contact at any suitable place, such as against the side of the lug pan below the dolly.

Figure 8:
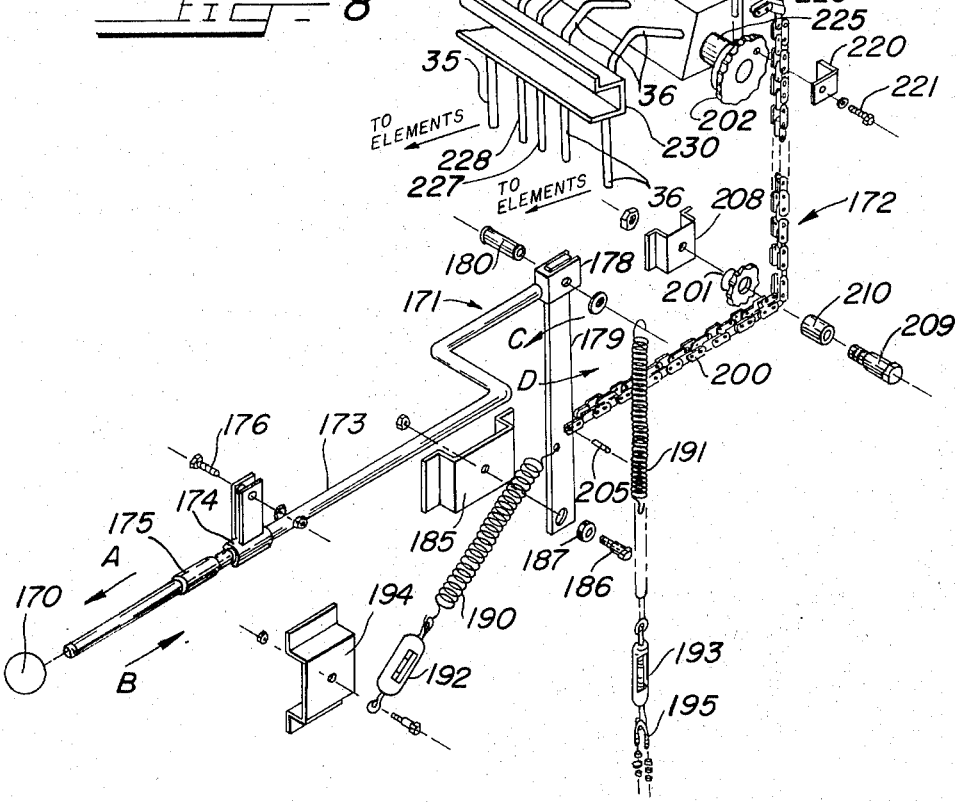
FIG. 8 is an exploded view of a lift for the heating elements.

FIG. 8 shows details of a lift system used to raise and lower the heating elements. The lift raises the element when a knob 170 is slid in direction A and lowers the element when the knob 170 is slid in direction B.

In greater detail, the major elements of this lift system comprise a toggle action control lever system 171, a link chain system 172, and an element support system 173.

The control lever system includes a shaft 173 sliding in bearing 175 housed in pivot arm 174. The pivot arm 174 is held in place by a bolt 176. One end of the shaft has a control knob 170 secured thereto, and the other end has a U-shaped bracket 178 attached thereto. The bracket 178 is secured to the upper end of a lever 179 by means of a pin 180. The lower end of lever 179 is pivotally attached to a bracket 185 by means of a bolt 186 passing through a sleeve bearing 187. In this way, lever 179 swings in direction C when knob 170 is pulled in direction A, and lever 179 swings in direction D when knob 170 is pushed in direction B.

A snap or toggle action is provided by two coiled springs 190, 191 having their tensions adjusted by turn buckles 192, 193, respectively. The outer ends of the turn buckles 192, 193 are attached to cabinet housing 20 by means of bracket 194 and shackle 195. Thus, when lever 179 swings in direction C, the tension spring 190 lesses the amount of pull required by the operator to raise the elements. At the same time, when lever 179 swings over center in direction C, the spring 191 acts as a counterbalance to maintain the elements in the raised position.

The link chain system comprises a link chain 200 extending from lever 179, over an idler sprocket 201, to an actuation sprocket 202. At one end, the chain is attached to the lever 179 by means of a pin 205. The idler sprocket 201 is attached to the housing 20 by means of a bracket 208, and the combination of a bolt 209 and sleeve bearing 210. At the other end, chain 200 is atached to the actuation sprocket 202 by means of a bracket 220 and a bolt 221. It should now be clear that, when lever 179 swings in direction C, the chain 200 rotates sprocket 202 in direction E. When lever 179 swings in direction D, the sprocket 202 rotates in direction F.

The element support system 173 comprises a horizontal element support housing with a pivot shaft 225 welded to each end. The pivot shaft is rigidly affixed to the actuator sprocket 202 by means of a pin 226. Extending first perpendicularly from the element support housing and then downwardly are the heating elements and two rods 227, 228 for supporting the food baskets 33, 34. A rail 230 is welded to the rods 227, 228 to receive and support a hanger 231 on the end of each basket. When the actuator sprocket rotates in direction E, the heating elements 35, 36 rise. (Baskets 33, 34 are manually removed from hanger 230 before elements are lifted.) When the sprocket 202 turns in direction F, the elements are lowered. THe motive forces for the system are provided by pulling or pushing knob 170, by springs 190, 191, and by gravity acting downwardly on the weight of elements 35, 36.

The lift assembly operates this way. The user pulls knob 170, with the aid of tension spring 190, in direction A. The lever 179 moves in direction C. The link chain 200 is pulled and sprocket 202 rotates in direction E to turn element support housing and lift the heating elements. As lever arm 179 moves over center in direction C, spring 191 gives a snap action and serves as a counterbalance to maintain elements in raised position. When knob 170 is pushed in direction B, the reverse action takes place and elements are lowered into the fryer.

The operation of the filter system should now be apparent. A clean tube of filter paper 132 is placed inside the concentric wire cages or cylinders 130, 131, deposited inside the bucket, and compressed between the gaskets 93, 121 when the pot or bucket 110 is clamped in place. The upper and lower seals have approximately 50 duro hardness. They are made of silicone, an absorbing material, that withstands high temperatures. With this seal and the stiffness of the filter, there is a film and excellent seal making it possible for the changing oil to flow in a downstream direction and through the filter. The shaft 55 is rotated to lock the pot or bucket 110 in a closed position and to open the valve 64 to the flow of cooking oil. Electrical switch 69a energizes motor-pump 44 or a timer, both of which control the pump-motor on opening and closing of the valve. Solenoid 69b and position detector switch 150 enable valve handle operation. Initially, the oil level is seen at the top of the tube 116. As oil seeps through the paper 132, large solids are trapped inside the filter sleeve, as its pores become clogged with smaller particles. The level of oil progressively drops in the glass tube 116, as the filter 132 becomes progressively clogged.

When the level falls to a predetermined level, the handle controlled shaft 55 in turned to closed valve 64, switch 69a energizes a timer which keeps motor-pump running for two and three-quarters additional minutes to pump any remaining oil in the filter housing back into the fryer reservoir and the sliding cover latch 58 unlocks the pot or bucket 110. Then the pot or bucket 110 is opened, and the filter paper 132 is replaced.

The invention provides for various modifications which will occur to those who are skilled in the art. Therefore, the appended claims are to be construed to cover all equivalent structures.

I claim:

1. An oil filter system for continuously filtering cooking oil comprising means for cooking food in a deep well open to atmospheric pressure and at least partially filled with said cooking oil, gravity feed means for continuously draining oil from said well, filter means, pump means for transmitting said gravity fed oil through said filter means and back to said open well for filtering the cooking oil throughout an entire cooking cycle, means comprising a pot arrangement containing said filter means, said filter means comprising a pair of concentric open frame support cylinders having a cylinder of filter paper positioned between them, the filter paper being made from mercerized wood pulp fiber saturated by a melamine-formaldehyde resin, which is in the order of 20 percent–40 percent by weight, direct viewing means for providing a reliable display to view for indicating a clogged filter condition, said pot having a quick disconnect means for enabling a quick and easy changing of the filter material while cooking is in process, gasket means at the top and bottom of said pot for compression against opposite ends of said cylinders, means for shutting down the flow of said oil in said system, and means responsive to said shutting down means for reducing the chance of burning an operator who is replacing the filter by precluding an opening of said pot except during a cleaning cycle while no oil is flowing in said system.

2. A deep fat fryer comprising an open and unpressurized deep well, a filter positioned under said well for gravity draining of oil from said well to said filter, a pump, oil conveying system means comprising a closed system for conveying cooking oil from the gravity drain of said deep well through said filter, said pump and back to said well, means comprising an electrical system for controlling said pump, and interlocking means for inhibiting said pump when said conveying system is open and enabling said pump when said oil conveying system is closed.

3. The fryer of claim 2 and a heating element in said deep well, and lift means for raising and lowering said element, said lift means comprising a spring biased toggle lever system.

4. The fryer of claim 2 wherein said interlocking means comprise at least one electrical switch operated responsive to an opening and closing of said system.

5. The fryer of claim 4 and a heating element in said deep well, and lift means for raising and lowering said element, said lift means comprising a spring biased toggle lever system.

6. The fryer of claim 5 wherein said filter comprises a pair of concentric open frame support cylinders having a cylinder of filter paper positioned between them, the filter paper being made from mercerized wood pulp fiber saturated by a melamine-formaldehyde resin, which is in the order of 20 percent–40 percent by weight.

7. The fryer of claim 6 wherein said filter paper is in the order of 25–35 mils thick, with an A.C. oil flow test of 100–200 secs/1,000cc and a Frazier Air Flow of 1.5 to 3.5 cubic feet per square foot of filter material measured at a pressure differential equal to approximately one-half inch of water.

* * * * *